United States Patent [19]

Heide

[11] Patent Number: 4,534,544

[45] Date of Patent: Aug. 13, 1985

[54] LIFT

[75] Inventor: Carsten Heide, Bielefeld, Fed. Rep. of Germany

[73] Assignee: American Microsystems, Inc., Santa Clara, Calif.

[21] Appl. No.: 542,288

[22] Filed: Oct. 14, 1983

[30] Foreign Application Priority Data

Oct. 16, 1982 [DE] Fed. Rep. of Germany ... 8229071[U]

[51] Int. Cl.[3] .............................................. B60P 1/48

[52] U.S. Cl. .................................... 254/9 C; 182/63; 182/141; 254/122; 254/127

[58] Field of Search ................. 254/9 R, 9 C, 9 B, 47, 254/122, 124, 127, 426; 5/62, 63, 64, 65, 11; 182/63, 141; 187/8.71, 8.72, 18

[56] References Cited

U.S. PATENT DOCUMENTS

| | | | |
|---|---|---|---|
| 1,942,945 | 1/1934 | Smith | 187/8.72 |
| 3,282,566 | 11/1966 | Clarke | 187/8.71 |
| 3,743,344 | 7/1973 | Jameson | 5/63 |
| 3,785,462 | 1/1974 | Coad et al. | 254/122 |

*Primary Examiner*—Frederick R. Schmidt
*Assistant Examiner*—Judy J. Hartman
*Attorney, Agent, or Firm*—Steven F. Caserza; Alan H. MacPherson; Kenneth E. Leeds

[57] ABSTRACT

A lift consists of a platform that the article to be lifted rests on and a scissors jack that is attached to the bottom of the platform and that can be spread up out of an extended position with rollers. One pair of the parallel scissoring legs of the jack is firmly articulated with the platform and the other pair of scissoring legs is attached to a shaft that travels parallel to the bottom of the platform inside a guide mounted on it. Rollers are mounted on a rigid axle and the axle is engaged by two chains that wrap around chain wheels rigidly attached to the shaft and which are connected to a transverse beam. The front end of the transverse beam is connected to a tensioning device that operates parallel to the platform. Two independently rotating rollers are mounted on the axle on each side of the jack, each roller rests against an auxiliary rail and a guide rail on each inside scissoring leg and the auxiliary rails are inside the jack. One end of each auxiliary rail is mounted on the shaft and the auxiliary rails and guide rails are about half as long toward the free ends of the scissoring legs as the section of scissoring leg that extends from the center to the free end of the scissoring parts.

4 Claims, 3 Drawing Figures

LIFT

BACKGROUND OF THE INVENTION

The present invention relates to a lift consisting of a platform that the article to be lifted rests on and of a scissors jack that is attached to the bottomm of the platform and that can be spread up out of an extended position with rollers.

Lifts of this overall type are known, for example, from German Utility Model Nos. 7 932 713 and 8 122 370.

SUMMARY OF THE INVENTION

The object of the present invention is a substantial improvement in a lift of the same overall type, in which the platform can be elevated more rapidly and retained with greater stability in the elevated position.

This object is attained in accordance with the invention in a lift of the same overall type wherein one pair of the parallel scissoring legs of the jack is firmly articulated with the platform, another pair of scissoring legs is attached to a shaft that travels parallel to the bottom of the platform inside a guide mounted on it, the rollers are mounted on a rigid axle, the axle is engaged by two chains that wrap around chain wheels rigidly attached to the shaft and connected to a transverse beam, the front end of the transverse beam is connected to a tensioning device that operates parallel to the platform, two independently rotating rollers are mounted on the axle on each side of the jack, each roller rests against an auxiliary rail and a guide rail on each inside scissoring leg and the auxiliary rails are inside the jack, one end of each auxiliary rail is mounted on the shaft, and the auxiliary rails and guide rails are about half as long toward the free ends of the scissoring legs as the section of scissoring leg that extends from the center to the free end of the scissoring parts.

This design ensures that the platform will remain horizontal as it is elevated even when loaded on one side and can be elevated at a rate that is almost constant over its total lifting path.

The platform remains constant even when loaded on one side because of the shaft and the chain wheels rigidly attached to it, which ensures that the scissoring legs articulated with the platform will always move the same distance. Since the rollers are also mounted on a common and rigid axle, an irregular forward tension and hence tipping of the platform when it is loaded on one side is impossible.

The almost constant rate of platform elevation is ensured by the rollers, which spread the scissoring parts up out of the extended position, engaging in approximately the middle of each section of the scissoring legs. This ensures uninterrupted spreading even while elevation, which results almost exclusively from the horizontal displacement of the rollers, is being initiated so that the rate of elevation practically equals the rate of elevation established when the upward displacement of the platform is almost exclusively caused by the motion of the scissoring legs mounted on the shaft.

In a preferred embodiment the auxiliary rails and guide rails are curved and form a wedge-shaped gap with an open side that faces away from the central scissoring point. Moreover, the free ends of the auxiliary rails are connected by a crosshead. Further, the sections of scissoring legs that extend toward the free end are preferably shorter than the sections connected to the platform or to the shaft and transport rollers are provided at the free ends of the scissoring legs. The tensioning device preferably consists of a hydraulic cylinder with a piston rod to which the transverse beam is attached.

Some preferred embodiments of the invention will now be described with reference to the attached drawings, wherein

DETAILED DESCRIPTION OF THE PREFERRED EMBODIMENTS

Figure 1:
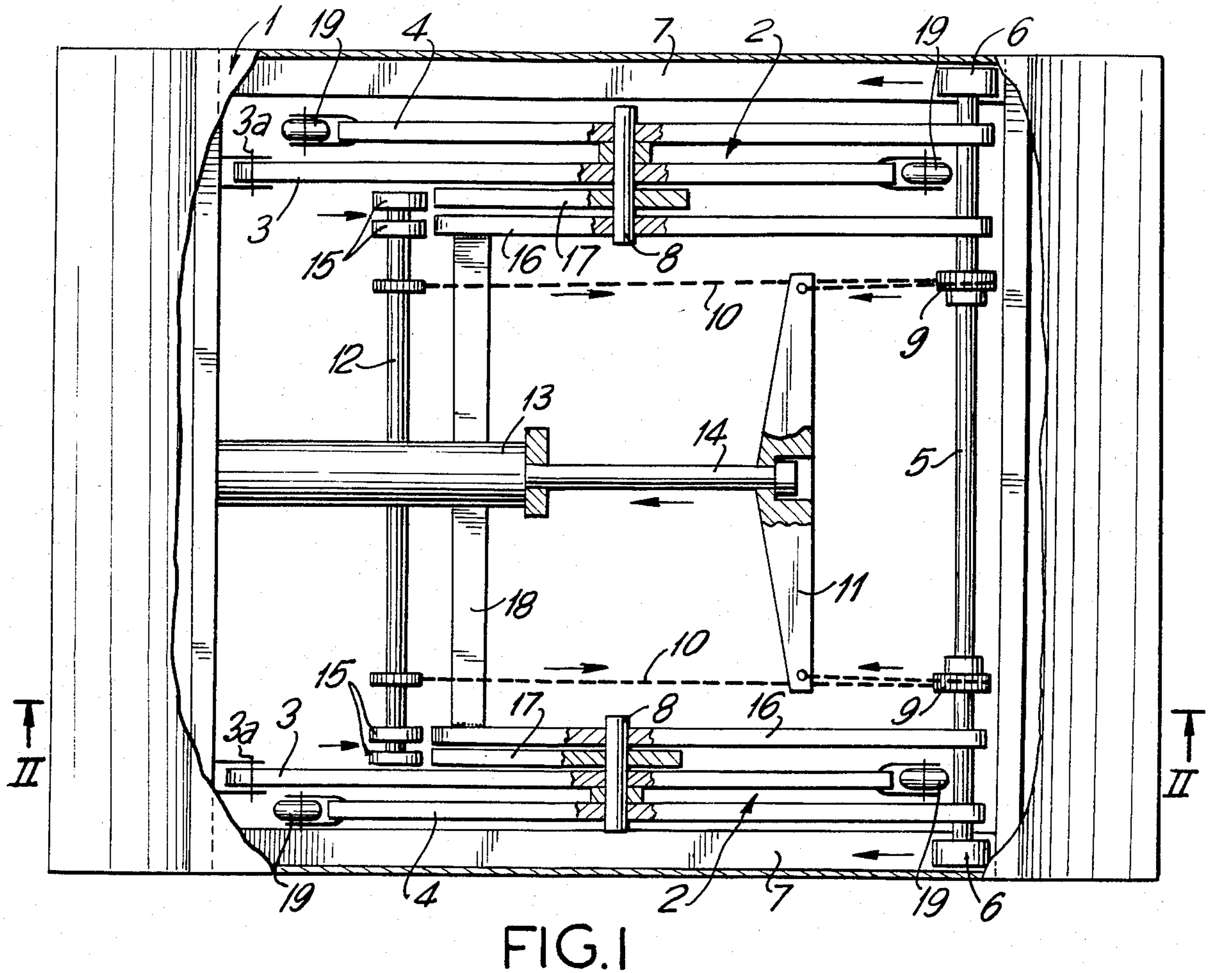
FIG. 1 is a top view of a lift with the platform broken through and the jack in partial section.
Figure 2:
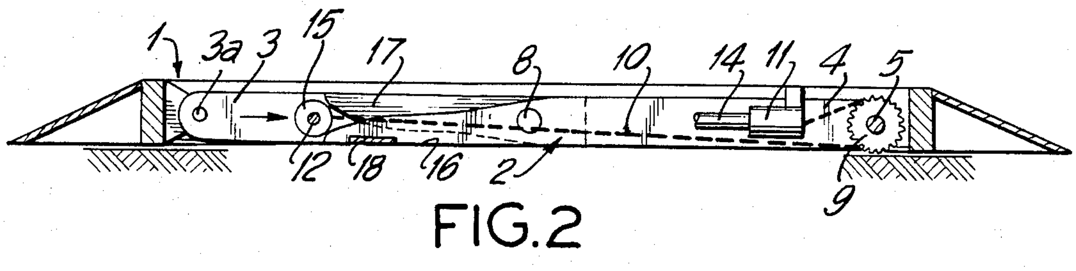
FIG. 2 is a section along line II—II in FIG. 1 showing the jack completely collapsed.
Figure 3:
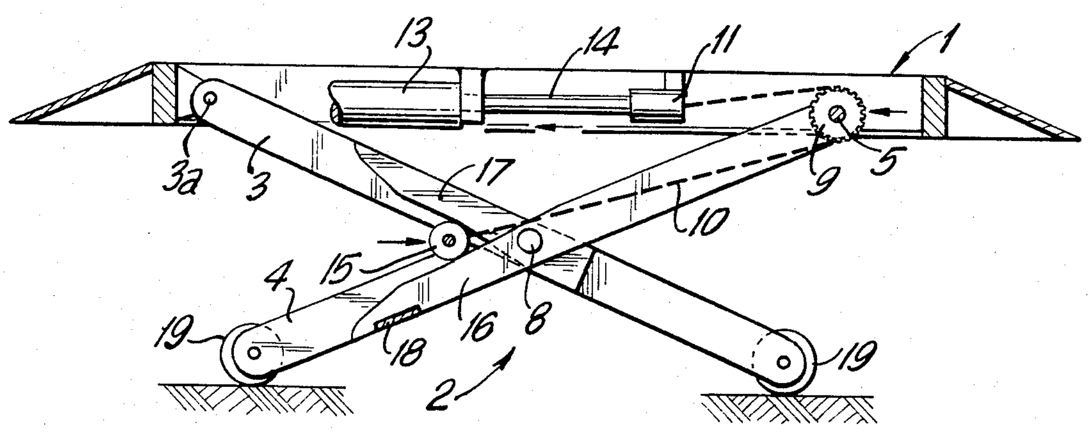
FIG. 3 is a section corresponding to that in FIG. 2 but with the jack extended.

The lift illustrated in FIGS. 1 through 3 consists essentially of a platform 1 that the article to be lifted rests on and a scissors jack 2 that is attached to the bottom of the platform.

As will be evident from the drawings, one pair of the parallel scissoring legs 3 of the jack is firmly articulated with platform 1 at 3*a*. The other pair of scissoring legs 4 on the other hand is attached to a shaft that has guide rollers 6 at its head. Guide rollers 6 travel parallel to platform 1 inside guides 7 mounted on its bottom.

The scissoring legs 3 and 4 on each side of the overall scissors jack 2 are mounted so that each pair can pivot together on a bearing pin 8.

Two chain wheels 9 are rigidly mounted on shaft 5. Two chains 10 are positioned around chain wheels 9. One end of each chain 10 is attached to a transverse beam 11 and the other end of each chain 10 is attached to a rigid axle 12.

Transverse beam 11 is connected for back and forth movement to the front of a tensioning device that consists of a hydraulic cylinder 13 with a piston rod 14 to which transverse beam 11 is attached. Hydraulic cylinder 13 is rigidly attached to the bottom of platform 1 and piston rod 14 travels parallel to the platform.

Each face of rigid axle 12 has a roller 15, each of which rotates independently of the other. Each roller 15 rests against an auxiliary rail 16 and a guide rail 17.

Guide rails 17 are rigidly attached to each inside scissoring leg 3, whereas auxiliary rails 16 can be pivoted parallel to outer scissoring legs 4 and opposite to guide rail 17 and are mounted at one end to shaft 5.

The free ends of auxiliary rails 16 are rigidly connected by a crosshead 18.

As will be evident from the drawings, both auxiliary rail 16 and guide rail 17 are shorter than the sections of the scissoring legs that extend from the central scissoring point to the free ends of legs 3 and 4. The length of auxiliary rail 16 and of guide rail 17 toward the free end of the legs is about half the length of the sections of the scissoring legs that extend from the central scissoring point to the free ends of legs 3 and 4.

Auxiliary rails 16 and guide rails 17 are curved where they are engaged by rollers 15, leaving a wedge-shaped gap with an open side that faces away from the central scissoring point.

As will be evident from FIG. 1 in particular, there are transport rollers 19 on the free ends of the of the sections of scissoring legs 3 and 4. These sections are also shorter than the sections attached to platform 1 or to shaft 5. Shaft 5 does not, therefore, prevent scissoring legs 3 and 4 from being folded together parallel to each other, as will be evident from FIG. 1.

It will be appreciated that the instant specification and claims are set forth by way of illustration and not limitation, and that various modifications and changes may be made without departing from the spirit and scope of the present invention.

What is claimed is:

1. A lift comprising: a platform having a top side on which an article to be lifted rests and an underside; and a scissors jack attached below the platform and comprising a shaft disposed at the underside of the platform and having two chain wheels rotationally fixed thereto, means connected to the platform for guiding the shaft for movement along one direction parallel to the underside of the platform, a first pair of parallel scissoring legs having one end of each articulated with the platform, a second pair of parallel scissoring legs havine one end of each attached to the shaft and wherein the first and second pairs of legs are connected at scissoring axes intermediate of each of the first and second pairs of legs, a transverse beam, means fixed to the underside of the platform and connected to the transverse beam for moving the transverse beam parallel to the underside of the platform along said one direction and towards and away from the shaft, a pair of auxiliary rails connected at one end to the shaft and at an intermediate point to the scissoring axes, a cross-head connecting the free ends of the pair of auxiliary rails, a pair of guide rails connected at one end to the scissoring axes, wherein the pairs of auxiliary rails and guide rails have curved portions and form a wedge-shaped gap with an open side that faces away from the scissoring axes, and the pairs of auxiliary rails and guide rails are about half as long from the scissoring axes to their free ends as the free ends of the first and second pairs of scissoring legs to the scissoring axes, an axle disposed parallel with the shaft and having two independently rotating rollers mounted on each end thereof and resting against one auxiliary rail and one guide rail at the curved portions thereof and two chains connected at one end to the axle and which extend around the chain wheels on the shaft and are connected at the other end to the transverse beam.

2. The lift as in claim 1, wherein portions of the first and second pairs of scissoring legs that extend towards their free ends are shorter than portions connected to the platform or to the shaft.

3. The lift as in claim 1, further comprising transport rollers at the free ends of the first and second pairs of scissoring legs.

4. The lift as in claim 1, wherein the means for moving the transverse beam comprises a tensioning device consisting of a hydraulic cylinder with a piston rod to which the transverse beam is attached.

* * * * *

UNITED STATES PATENT AND TRADEMARK OFFICE

CERTIFICATE OF CORRECTION

PATENT NO. : 4,534,544

DATED : August 13, 1985

INVENTOR(S) : Carsten Heide

It is certified that error appears in the above-identified patent and that said Letters Patent is hereby corrected as shown below:

| | |
|---|---|
| 1st page, after "[73] Assignee:" | Delete "American Microsystems, Inc., Santa Clara, Calif." and substitute -- FLEXLIFT HUBERATE GmbH, Bielefeld, Federal Republic of Germany-- |
| 1st page, after "Attorney, Agent, or Firm" | Delete "Steven F. Caserza; Alan H. MacPherson; Kenneth E. Leeds" and substitute --Sprung, Horn, Kramer & Woods-- |
| Col. 1, line 7 | Correct spelling of "bottom" |

Signed and Sealed this

*Thirty-first* Day of *December 1985*

[SEAL]

*Attest:*

DONALD J. QUIGG

*Attesting Officer* *Commissioner of Patents and Trademarks*